United States Patent
Ezumi et al.

(10) Patent No.: US 7,542,066 B2
(45) Date of Patent: Jun. 2, 2009

(54) COMMUNICATION TERMINAL AND METHOD FOR CONTROLLING THE SAME

(75) Inventors: Yosuke Ezumi, Ohta-ku (JP); Yukio Nohata, Yokohama (JP); Atsushi Takahashi, Kawasaki (JP); Muneki Nakao, Yokohama (JP); Shinya Kogure, Ota (JP)

(73) Assignee: Canon Kabushiki Kaisha, Tokyo (JP)

( * ) Notice: Subject to any disclaimer, the term of this patent is extended or adjusted under 35 U.S.C. 154(b) by 809 days.

(21) Appl. No.: 11/134,884

(22) Filed: May 23, 2005

(65) Prior Publication Data

US 2005/0271062 A1 Dec. 8, 2005

(30) Foreign Application Priority Data

Jun. 8, 2004 (JP) ............................. 2004-169279

(51) Int. Cl.
*H04N 7/14* (2006.01)
*H04W 4/00* (2006.01)

(52) U.S. Cl. ............... 348/14.01; 348/14.02; 348/14.08

(58) Field of Classification Search ... 348/14.01–14.16; 455/556.1, 462
See application file for complete search history.

(56) References Cited

U.S. PATENT DOCUMENTS 6,952,471 B1 * 10/2005 Cannon et al. ......... 379/390.01

2004/0150713 A1 * 8/2004 Cheng ..................... 348/14.02

FOREIGN PATENT DOCUMENTS

| GB | 2242335 A | * | 9/1991 |
|---|---|---|---|
| JP | 5-022721 A | | 1/1993 |
| JP | 5-199328 A | | 8/1993 |
| JP | 6-125551 A | | 5/1994 |
| JP | 09-214619 A | | 8/1997 |
| JP | 2002-111801 A | | 4/2002 |
| WO | 9839906 A1 | | 9/1998 |

* cited by examiner

*Primary Examiner*—Melur Ramakrishnaiah
(74) *Attorney, Agent, or Firm*—Canon U.S.A., Inc. I.P. Division

(57) ABSTRACT

A communication terminal includes a base and a wireless handset connected to the base with a wireless connection. In the communication terminal, an audio communication channel of interactive audiovisual communication or audio communication can be transferred between the base and the wireless handset. The communication terminal performs interactive audiovisual communication or audio communication by IP telephony over an IP network. The base includes a base handset serving as an audio inputting and outputting unit and a camera serving as an image inputting and outputting unit, where both units are used for interactive audiovisual communication. The wireless handset includes a microphone, a speaker, and a receiver, where these components constituting an audio inputting and outputting unit.

8 Claims, 12 Drawing Sheets

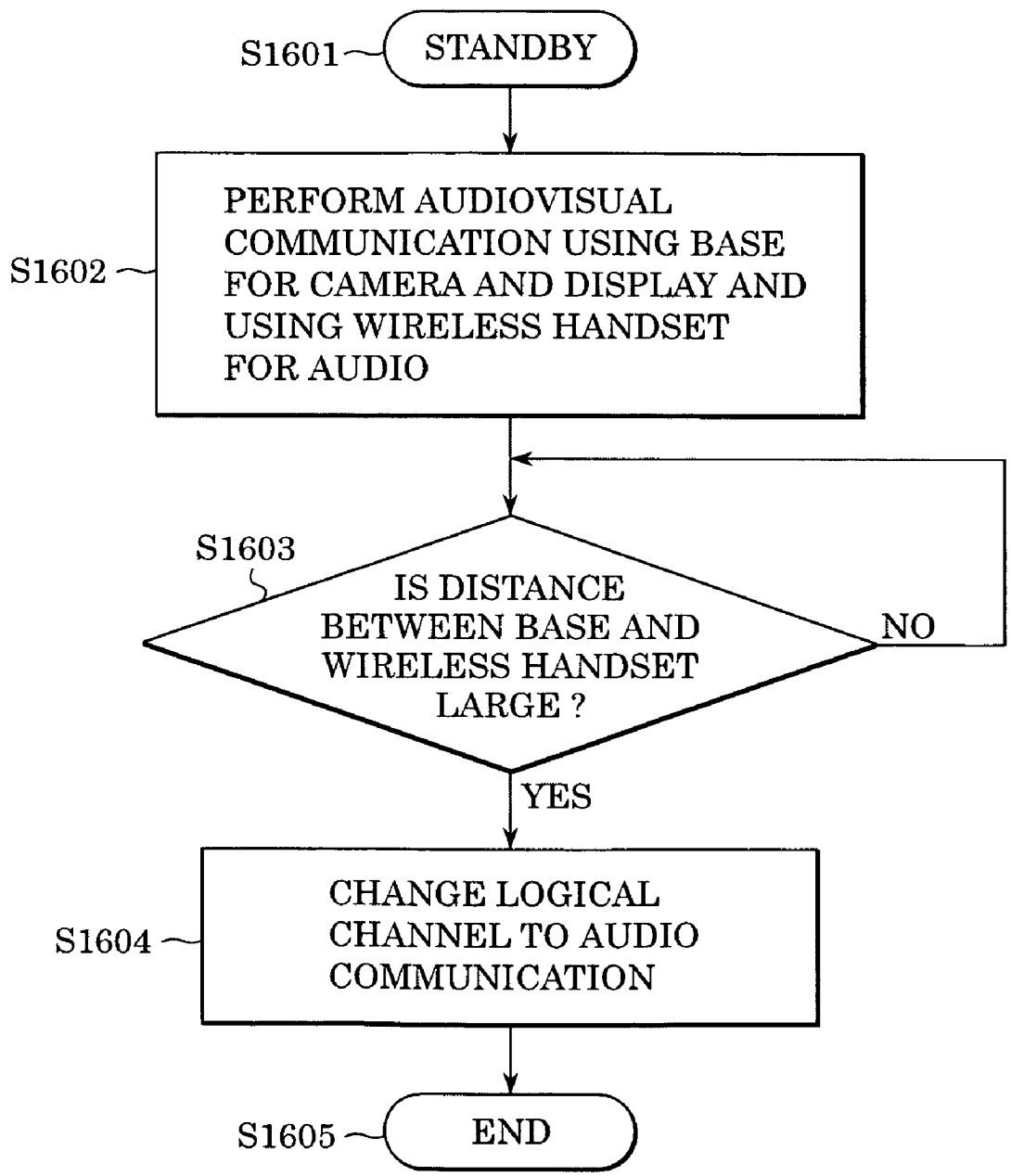

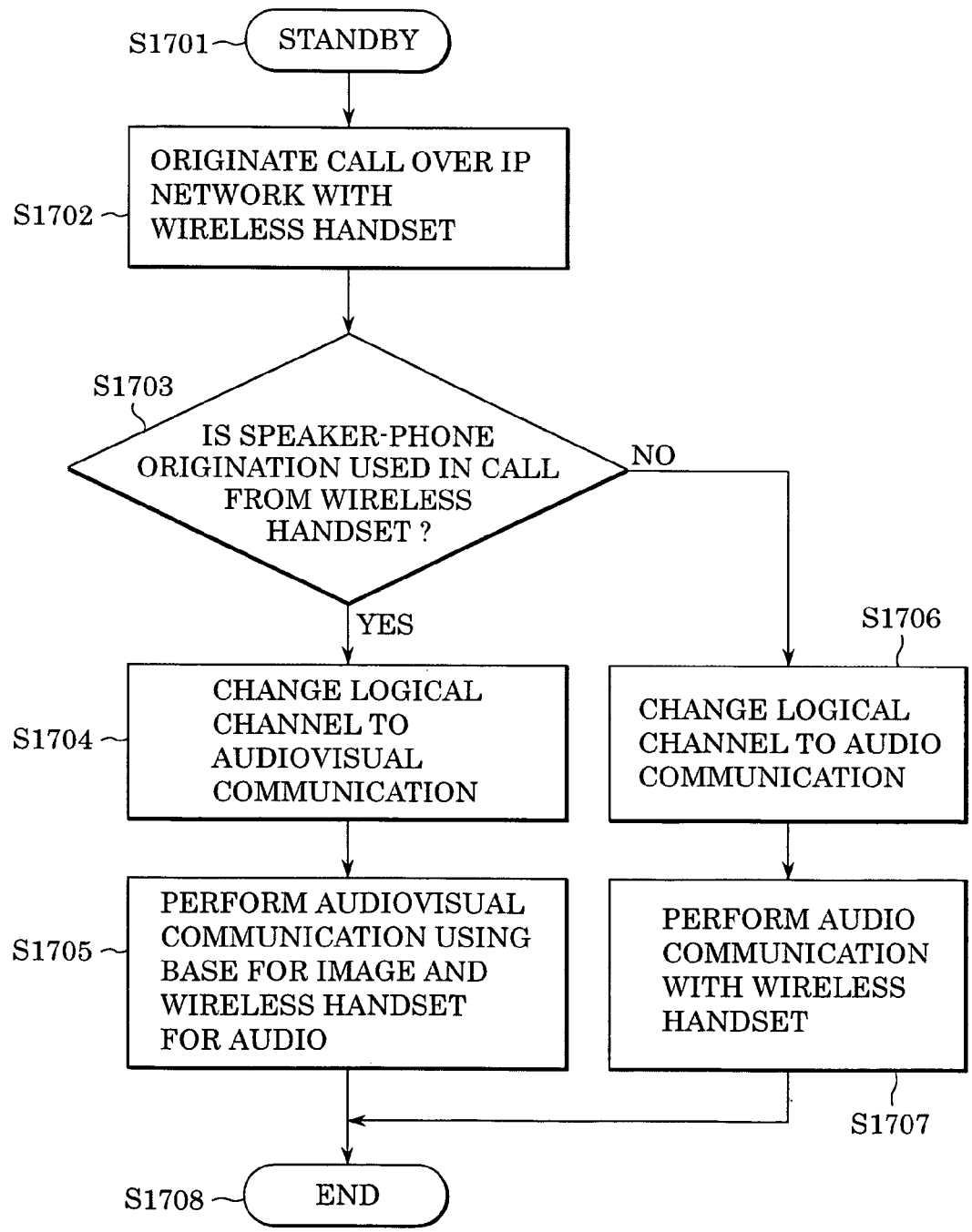

COMMUNICATION TERMINAL AND METHOD FOR CONTROLLING THE SAME

BACKGROUND OF THE INVENTION

1. Field of the Invention

The present invention relates to a communication terminal for performing interactive audiovisual communication or audio communication with Internet Protocol (IP) telephony over an IP network and relates to a method for controlling such a communication terminal.

2. Description of the Related Art

Image transmission and reception in videophones, including both a telephone set including a handset connected to a base unit with a cord and a cordless telephone set, in most cases, uses a display screen of only a base unit.

Currently, telephone products supporting interactive audiovisual communication are mostly used in circuit switched networks, such as an integrated services digital network (ISDN), and videophone products capable of placing a call over an IP network are not known.

Examples of videophones used over ISDNs previously proposed include the following:

Japanese Patent Laid-Open No. 6-125551 discloses that a cordless videophone system connected to an ISDN line informs a cordless handset of whether an incoming call received by the cordless handset is in a videophone mode or an audio phone mode from a base unit using a radio signal.

Japanese Patent Laid-Open No. 5-022721 discloses that a cordless videophone system connected to an ISDN line sends audio signals and distance signals to a cordless handset, detects the distance between the cordless handset and a base unit, and zooms a camera of the base unit.

These videophone systems capable of performing an interactive audiovisual communication function (videophone function) of a base unit while audio communication is carried out with a handset offer convenience to some extent by informing the handset of a status of an incoming call when a user answers the call with the handset, as in Japanese Patent Laid-Open No. 6-125551, by zooming the camera in accordance with the distance between the handset and the base unit, as in Japanese Patent Laid-Open No. 5-022721, or the like. These systems are adequate in terms of usage over an ISDN.

However, for the system disclosed in Japanese Patent Laid-Open No. 6-125551, although a user is capable of determining whether an incoming call is in a videophone mode or audio phone mode when responding to the incoming call with the handset, the user is not able to switch the call with the handset. Therefore, the user is not able to perform interactive audiovisual communication while answering the call with the handset. The system thus has disadvantages in that the user must call the caller back from the base unit in order to perform interactive audiovisual communication.

On the other hand, for the system disclosed in Japanese Patent Laid-Open No. 5-022721, the zoom position of a camera is capable of being switched in accordance with the distance between the handset and the base unit, but the display is not switched. Therefore, a user must use the display screen of the base unit every time. As a result, the user is required to be present in the proximity of the base unit. Therefore the system has a problem in that the user has a limited range of motion while talking on the telephone with the handset in interactive audiovisual communication.

Additionally, since ISDN does not square with the reality of communication networks today, the number of subscribers who use ISDN lines as telephone lines is in decline.

Nowadays, the number of users of IP telephony, or voice over Internet Protocol (VoIP), which employs IP networks, is increasing tremendously. Since current communications over IP networks are under development, it is necessary for telephone services to have a terminal supporting both an IP network and a circuit switched network. VoIP originally uses the videoconference standard, so that it is capable of performing interactive audiovisual communication including transmission of both an audio stream and a video stream.

SUMMARY OF THE INVENTION

Accordingly, an aspect of the present invention is to provide a communication terminal capable of transferring an audio communication channel of interactive audiovisual communication or audio communication between a base and a handset, the handset being connected to the base with a wireless connection, and to provide a method for such a communication terminal.

According to the present invention, the foregoing aspect is attained by providing a communication terminal for performing interactive audiovisual communication or audio communication using Internet Protocol (IP) telephony over an IP network. The communication terminal includes a base, a wireless handset, and a transferring unit. The base includes an image inputting and outputting unit adapted to input and output images for the interactive audiovisual communication, and an audio inputting and outputting unit adapted to input and output audio for the interactive audiovisual communication and the audio communication. The wireless handset includes a connecting unit adapted to connect to the base with a wireless connection and an audio inputting and outputting unit adapted to input and output audio for at least the audio communication. The transferring unit is adapted to transfer an audio communication channel of the interactive audiovisual communication or the audio communication between the base and the wireless handset.

Other features and advantages of the present invention will be apparent from the following description taken in conjunction with the accompanying drawings, in which like reference characters designate the same or similar parts throughout the figures there.

BRIEF DESCRIPTION OF THE DRAWINGS

FIG. 11 is a flowchart of a control procedure for switching the communication mode between interactive audiovisual communication and audio communication in the communication terminal shown in FIG. 1 in accordance with a change in a status of the wireless handset (the distance between the base and the wireless handset).

FIG. 12 is a flowchart of a control procedure for switching the communication mode between interactive audiovisual communication and audio communication in the communication terminal shown in FIG. 1 in accordance with a status (a calling method) of the wireless handset.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
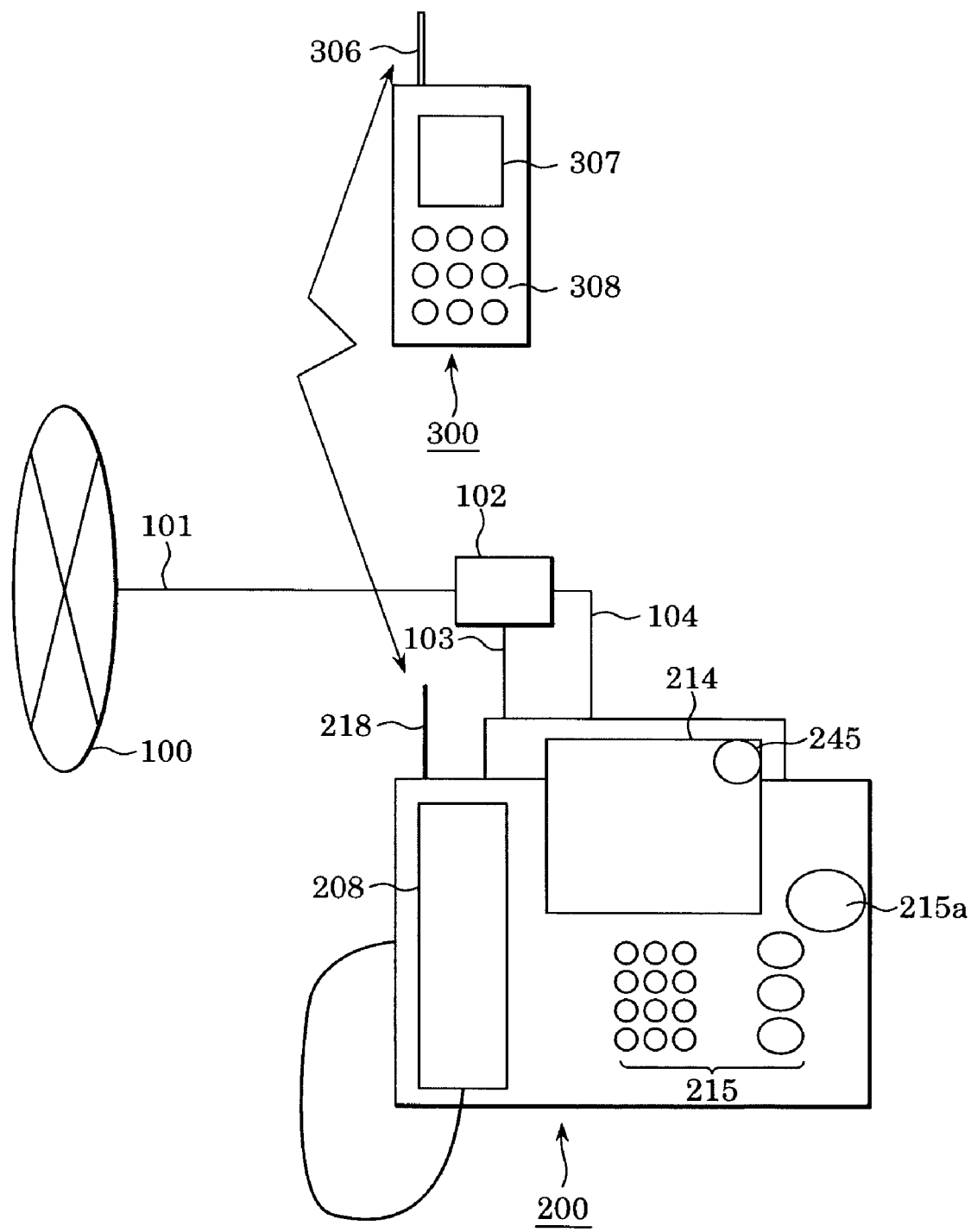
FIG. 1 shows a communication terminal according to an embodiment of the present invention.

FIG. 1 shows the structure of a communication terminal capable of performing both IP telephony and analog telephony according to an embodiment of the present invention.

In FIG. 1, a communication terminal 200 is connected to a public network 100 via a line 101. In this embodiment, the line 101 is an asymmetric digital subscriber line (ADSL), and it is divided by a splitter unit 102 into a line 104 with a bandwidth used for a public switched telephone network (PSTN) and a line 103 with a bandwidth used for an ADSL network. The lines 103 and 104 are connected to corresponding interfaces included in the communication terminal 200.

As is well known, ADSL utilizes a public line and realizes two types of communication (IP communication and analog audio communication) in a single line. ADSL is a form of digital subscriber line technologies (xDSL), which enable high-speed data transmission over existing telephone lines (metal cables) called subscriber lines via a dedicated modem (232).

ADSL is the most widely available form of xDSL and has the distinguishing characteristic that the upstream (from a user) and downstream (to a user) data rates are different, i.e., asymmetric. For example, a so-called 8 megabits per second (Mbps) ADSL service provides data transmission rates of up to about 512 kilobits per second (Kbps) upstream and 8 Mbps downstream in a pair of subscriber lines.

For telephone metal cables, which were designed for audio communication, only a part of the range of frequencies in a copper wire is used for audio communication (the used part is a frequency range from about 300 Hertz (Hz) to 3.4 KHz and is referred to as the "4 KHz band"). The ADSL technique exploits a high-frequency bandwidth above this 4 KHz band to carry out wideband data transmission. The ADSL technique achieves two types of communication, i.e., voice and data communication, in a single physical line. Examples of ADSL standards include ITU-T Recommendation G992.1 (G.dmt) (full-rate) using a frequency band of up to 1.1 MHz and ITU-T Rec. G992.2 (G.lite) (half-rate) using a frequency band of up to half of 1.1 MHz, i.e., 552 KHz. Various types are selected, depending on the telephone carrier.

With communication over IP networks, in addition to utilization of Internet resources on IP networks and e-mail transmission and reception, IP telephony (VoIP) communication can also be realized.

When audio data used in IP telephony is compressed by a pulse code modulation (PCM) codec, the data rate in u-law and A-law (ITU-T G.711) is 64 kbps. Many methods with a higher compression rate are used for compressing such audio data. For example, a code excited linear prediction (CELP) method, such as G.723.1, can perform coding at about 6 kbps, which is one-tenth of the 64 kbps described above, and therefore, ADSL can be the backbone of IP telephony. Other examples of xDSL technologies include high bit rate DSL (HDSL), which employs a plurality of pairs of subscriber lines, and very high bit rate DSL (VDSL), which is a much higher speed version of ADSL.

In this embodiment, the aim of the use of ADSL lines is to perform IP telephony communication. The connection between the communication terminal 200 and the public network 100 (including IP networks) may use any communication line, such as a fiber optic cable, a cable television (CATV) cable, or a radio connection.

The communication terminal 200 shown in FIG. 1 functions as a base unit of a cordless telephone and can be connected to a wireless telephone (wireless handset) 300 with a wireless connection.

The communication terminal 200 (hereinafter, also referred to as a base) includes a base display unit 214, a base operational unit 215, a base handset 208 serving as a unit adapted to input and output audio in audio communication, a base antenna 218, a camera 245 composed of an image capturing device, such as a charge-coupled device (CCD), and capable of capturing a moving image (and/or a still image). The camera 245 serves as a unit adapted to input and output an image mainly in interactive audiovisual communication.

In this embodiment, the operational unit 215 includes numeric keys, a function key, a handset-transfer key 215a for transferring a call to the wireless handset, and the like.

The wireless telephone 300 includes a handset display unit 307, a handset operational unit 308, and a handset antenna 306 for performing radio communication with the base.

Each operational unit of the communication terminal (base) 200 and the wireless telephone (handset) 300 includes keypads composed of numeric keys, a function key, and the like. Each display is composed of a liquid crystal display (LCD) panel, and the like.

Figure 2:
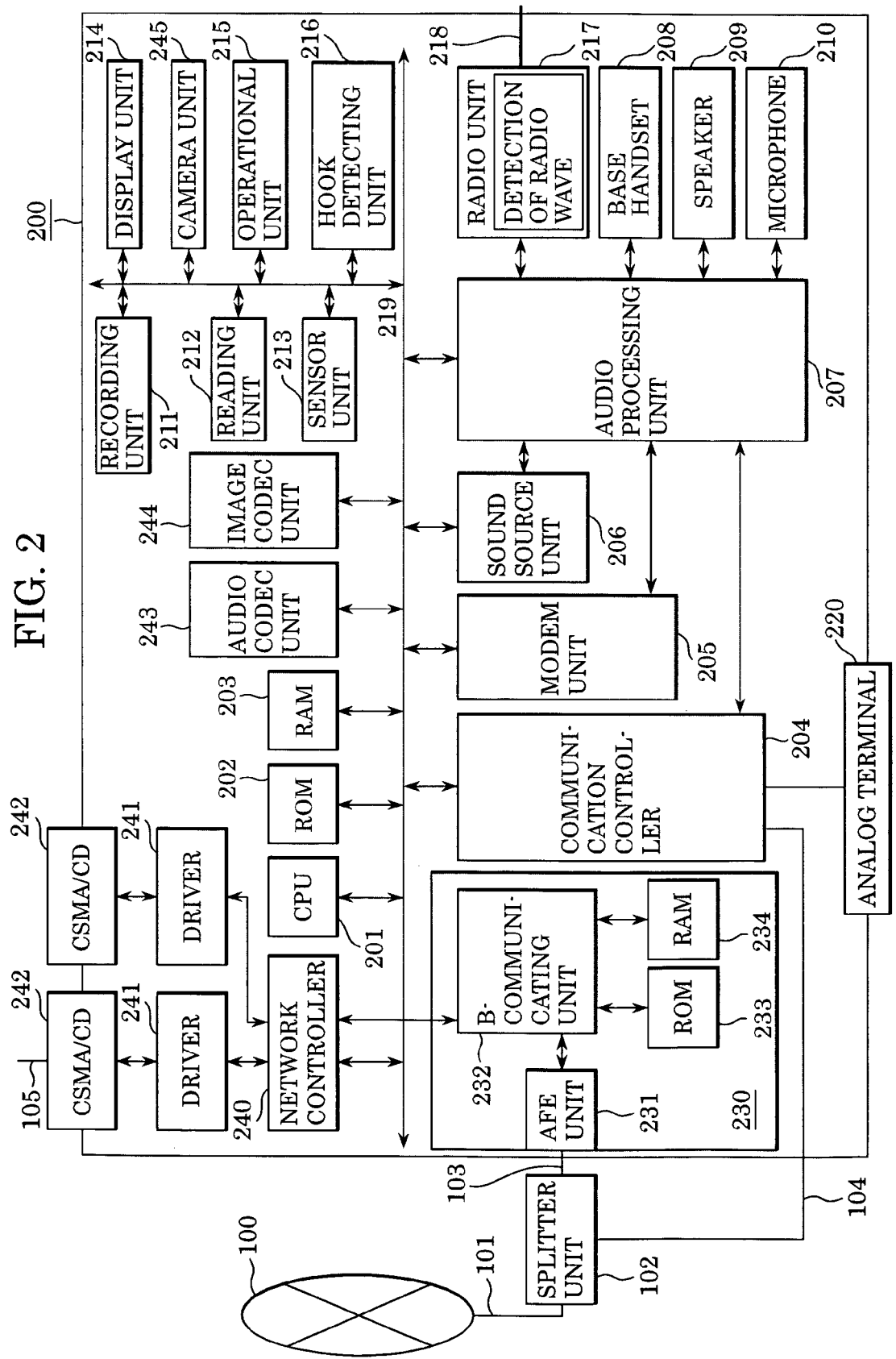
FIG. 2 is a block diagram of a control system of a base of the communication terminal shown in FIG. 1.

FIG. 2 shows the structure of a control system of the communication terminal 200 shown in FIG. 1. The communication terminal 200 is capable of IP telephony and interactive audiovisual communication and, in addition, is capable of inputting and outputting an image and facsimile communication.

In FIG. 2, a central processing unit (CPU) 201 receives a signal from each component via a data bus 219 and controls each component connected to the data bus 219 in accordance with the input signal. In other words, the CPU 201 controls the entire system according to a program stored in a read-only memory (ROM) 202 to connect the system to a network and control various protocols in order to perform processing. The control of the CPU 201 includes control used in operating, displaying, reading, and recording.

The ROM 202 is a memory storing a program and is composed of a mask ROM, a flash ROM, or the like. The ROM 202 may be, for example, a flash ROM or, for data requiring to be re-written and erased, an electrically erasable programmable ROM (EEPROM).

A random-access memory (RAM) 203 serves as a work area when the CPU 201 performs processing including call processing, browsing web pages, and email transmission and reception. The RAM 203 also serves as an area for processing data during image reading, image recording, and audio codec processing. Unlike the ROM 202, the RAM 203 stores temporary data.

The RAM 203 includes a battery-protected section storing information regarding time data, settings of various functions, data registered in an address book, and the like. The RAM 203 may be composed of an EEPROM, which is a nonvolatile memory.

A communication controller 204 is an interface for receiving the analog (PSTN) public line 104. In the case of an analog line, the communication controller 204 is composed of a diode full-wave rectification circuit connected to a telephone line (hereinafter, referred to as a subscriber line) from an exchange, a polarity equalizing circuit for equalizing the polarities of line voltages, a ringer detecting circuit which is connected to the subscriber line and which is used for detecting a ringing signal from the exchange, a pulse sending circuit for forming a circuit loop and sending a dial pulse to the exchange in response to an on-hook operation, and a hybrid converter for converting between two-wire and four-wire systems.

The communication terminal (base) 200 can be connected to an external analog terminal 220 (e.g., an analog telephone set) via an interface for the analog terminal.

A modulator-demodulator (modem) unit 205 is composed of a digital signal processor (DSP) and an analog front end (AFE). The modem unit 205 functions as a facsimile modem for performing group-3 (G3) facsimile transmission and reception under the control of the CPU 201. The modem unit 205 has a caller ID capability, which analyzes modem data (caller ID data), an echo cancellation capability, and a speakerphone capability.

A sound source unit 206 functions as a sound source of an on-hold tone and a ring tone and contains the function of creating sound-source data. The sound source unit 206 outputs data stored in the ROM 202 and the RAM 203 in the form of an analog signal under the control of the CPU 201. The sound source unit 206 also functions as a sound source for outputting call progress tones, such as a pseudo dial tone (DT), a busy tone (BT), and a ringback tone (RBT).

An audio processing unit 207 controls the paths of audio input and output signals from the modem unit 205, the sound source unit 206, the base handset 208, the communication controller 204, a base speaker 209, a base microphone 210, a base radio unit 217, which are described later, and the like.

The base handset 208 shown in FIG. 1 is used for audio input and output in a call over an ordinary line and a call by IP telephony. Whether the base handset 208 is in an on-hook state or an off-hook state is detected by a hook detecting unit 216, so that the on and off states of the circuit are controlled according to the detected hook state of the base handset 208.

The base speaker 209 outputs ring tone and recorded audio data and functions as a monitor while a speakerphone call is in progress. The base microphone 210 is used as an audio inputting unit when speakerphone function is activated.

The base radio unit 217 modulates control data and an audio signal, converts them into a form that can be transmitted with wireless communication, and sends them to the base antenna 218. The base radio unit 217 also acquires data demodulated from information sent through the base antenna 218 with wireless communication, outputs control data to the CPU 201, and outputs an audio signal to the audio processing unit 207. In a digital wireless system, digital audio data may be processed by an audio codec unit 243, which is described below. The base radio unit 217 has a function of detecting a level to check the radio field intensity between the wireless handset 300 and the communication terminal 200. Therefore, the base radio unit 217 detects the level of radio waves emitted from the wireless handset 300 and converts it from analog to digital, so that the radio field intensity can be determined by the CPU 201.

A recording unit 211 includes a known printing unit, such as a thermal printer, a thermal transfer printer, a laser beam printer, an inkjet printer, or the like. For recording an image sent from a facsimile, the recording unit 211 decodes digital data that is subjected to modified Huffman (MH) coding and modified READ (MR) coding or modified MR (MMR) coding, and then prints the decoded data as printing data.

The recording unit 211 is also used for printing a web page. For printing out data in a browser, one wave page of data described in a markup language and stored in the RAM 203 functioning as a receiving buffer is converted to data to be displayed, and the amount of data that can be displayed on the base display unit 214 at one time is stored in a display buffer within the RAM 203. Upon completion of storing data in the display buffer, the browser sends a notice to the recording unit 211.

When receiving a notice of completion of storing the data, the recording unit 211 reads the data from the display buffer, converts the data line-by-line to form printing data, and transfers the converted data to the printing unit. When finishing transferring the data, the recording unit 211 sends a notice to the browser. When data to be displayed next is present, the browser stores the data in the display buffer and then sends a notice to the recording unit 211. When all web pages of data are finished, i.e., there is no more data to be displayed, the browser sends a notice indicating the end of the web pages. The foregoing steps are repeated, and one page of data is transferred to the recording unit 211 and printed out.

A reading unit 212 includes a known document-reading unit, such as a CCD, a contact image sensor array, or the like. The reading unit 212 converts analog data read by the document-reading unit to digital data, encodes the digital data with a known coding method, such as MH coding, MR coding, MMR coding, or the like, and outputs the encoded data.

A sensor unit 213 senses the presence and the size of a document to be transmitted on the reading unit 212, and notifies the CPU 201 of its result. The sensor unit 213 also senses the presence and the size of recording paper, and notifies the CPU 201 of its result.

The base display unit 214 can display a text message entered from the base operational unit 215 used for key input or the like and a received text message. In addition, the base display unit 214 is used for displaying settings of various service functions for the telephone, information regarding a website received from a server over the Internet, the date and time, the status of a line during connection, the error status, and the like. The base display unit 214 is composed of a color/monochrome display device, such as a liquid crystal display (LCD). The base display unit 214 is also used for displaying a received image during interactive audiovisual communication and video captured with the camera unit installed in the communication terminal.

The camera 245 functions as a device for capturing video images for interactive audiovisual communication. An image codec unit 244 is connected to an IP network via broadband (B-) communicating unit 232 and is used for encoding images into encoded data corresponding to transmission speed and decoding it. The image codec unit 244, the camera 245, and the base display unit 214 serve as a function of interactive audiovisual communication (videophone function) in the base 200. For image transmission, images captured from the camera 245 are encoded by the image codec unit 244 such that the images correspond to IP network communication, and the encoded data is output to an IP network line via the B-communicating unit 232. For image reception, encoded data input from the IP network line and corresponding to transmission speed of the line is received by the B-communicating unit 232, the data is decoded by the image codec unit 244, and the decoded data is displayed on the base display unit 214. By performing image transmission and image reception simultaneously, a user at one end can transmit images to a party at the other end while receiving images from the party and displaying them, i.e., interactive audiovisual communication (videophone communication) is performed.

The base operational unit 215 is composed of a keyboard and/or a pointing device (e.g., mouse), or may be composed of keys. The base operational unit 215 and the base display unit 214 serve as a user interface. The base operational unit 215 accepts operations regarding web browsing, printing, originating and receiving calls, registering, and the like from a user, and conveys the operations to the CPU 201. The base operational unit 215 includes, for example, dialing keys including numerical keys, an asterisk key, a pound key (#) for inputting telephone numbers, URLs, alphabets, and marks, facsimile keys for controlling facsimile transmission and reception, an on-hook key for controlling the on and off states of the line, a hold key, a menu key for selecting function settings, and the like.

A network controller 240 performs control regarding various protocols for Internet communication. Examples of the protocols include the internet protocol (IP), user datagram protocol (UDP), real-time transport protocol (RTP), and resource reservation protocol (RSVP).

During communication by IP telephony, the network controller 240 receives audio signals from the base handset 208 via the audio processing unit 207, performs audio codec processing on the audio signals by means of the audio codec unit 243, transmits them while sequentially encoding them with G.711, G.729, or the like, and also receives audio data.

During interactive audiovisual communication, the network controller 240 performs image codec processing by means of the image codec unit 244, transmits image data while sequentially encoding it with a suitable encoding method, such as common intermediate format (CIF), moving picture experts group (MPEG) format, or the like, and also receives image data. Image data is subjected to compression processing or the like so as to conform to transmission.

In addition, the network controller 240 controls protocols for controlling calls in IP telephony (VoIP). Examples of the protocols include the session initial protocol (SIP), H.323, and media control gateway protocol (MCGP). The procedure for performing VoIP with each of these protocols is known. With respect to H.245 for negotiation control for interactive audiovisual communication and H.261 and H.263 for video codec processing, their respective procedures are also known.

In addition, the network controller 240 functions as a router, which is a hardware device that lies in between different networks and connects the networks to accurately deliver data transmitted over the networks to destinations, and has the network address translation (NAT) function used in a routing process. The NAT function converts between private IP addresses and original global IP addresses used for Internet access so that Internet access from a node to which only a local IP address is allocated in a transparent manner can be realized.

In addition, the network controller 240 controls the dynamic host configuration protocol (DHCP) for dynamically assigning IP addresses at startup and withdrawing the IP addresses at end and controls the password authentication protocol (PAP) and challenge-handshake authentication protocol (CHAP) used for security. The network controller 240 is connected to an ADSL modem unit 230, which functions as a connection part to the line, with a universal test & operations interface for ATM (UTOPIA).

The network controller 240 contains media access control (MAC) address, which is a hardware address that is set to identify a host on a network, controls input and output of at least one network interface card (NIC) 242 via at least one driver 241 (usually called "PHY") using a media independent interface (MII), and controls input and output of the ADSL modem unit 230 with respect to IP telephony and other IP communications. A plurality of NICs 242 and drivers 241 may be used, as shown in FIG. 2.

The NIC 242 may be based on an interface scheme, such as the carrier sense multiple access with collision detection (CSMA/CD), which is an Ethernet® protocol. The NIC 242 is connected to the data bus 219 via the driver 241. The NIC 242 is used for communicating with another device connected to a local-area network (LAN), but the control described later does not necessarily require the NIC 242. In FIG. 2, the plurality of NICs 242 is disposed in order to connect to LANs in different IP address segments. However, the number of the NICs 242 may be set to any number. A single NIC may be used.

The ADSL modem unit 230 functions as a communication controller for Internet connection and is connected to the digital interface 103 divided by the splitter unit 102. The ADSL modem unit 230 includes an analog front end (AFE) unit 231 and the B-communicating unit 232. The ADSL modem unit 230 includes a ROM 233 for storing a program for the ADSL modem unit and a RAM 234 serving as a data work area in such a way that the ROM 233 and the RAM 234 are connected to the B-communicating unit 232. The ADSL modem unit 230 is connected to the network controller 240 via an UTOPIA.

In this embodiment, ADSL technology is used in order to have full-time access to an IP network. For different methods, the ADSL modem unit 230 is replaced with a modem, router, or the like, corresponding to a selected network interface method, such as optical connection, another xDSL connection, wireless connection, or the like. The ADSL modem unit 230 installed within the terminal in this embodiment may be disposed as an external modem unit.

Figure 3:
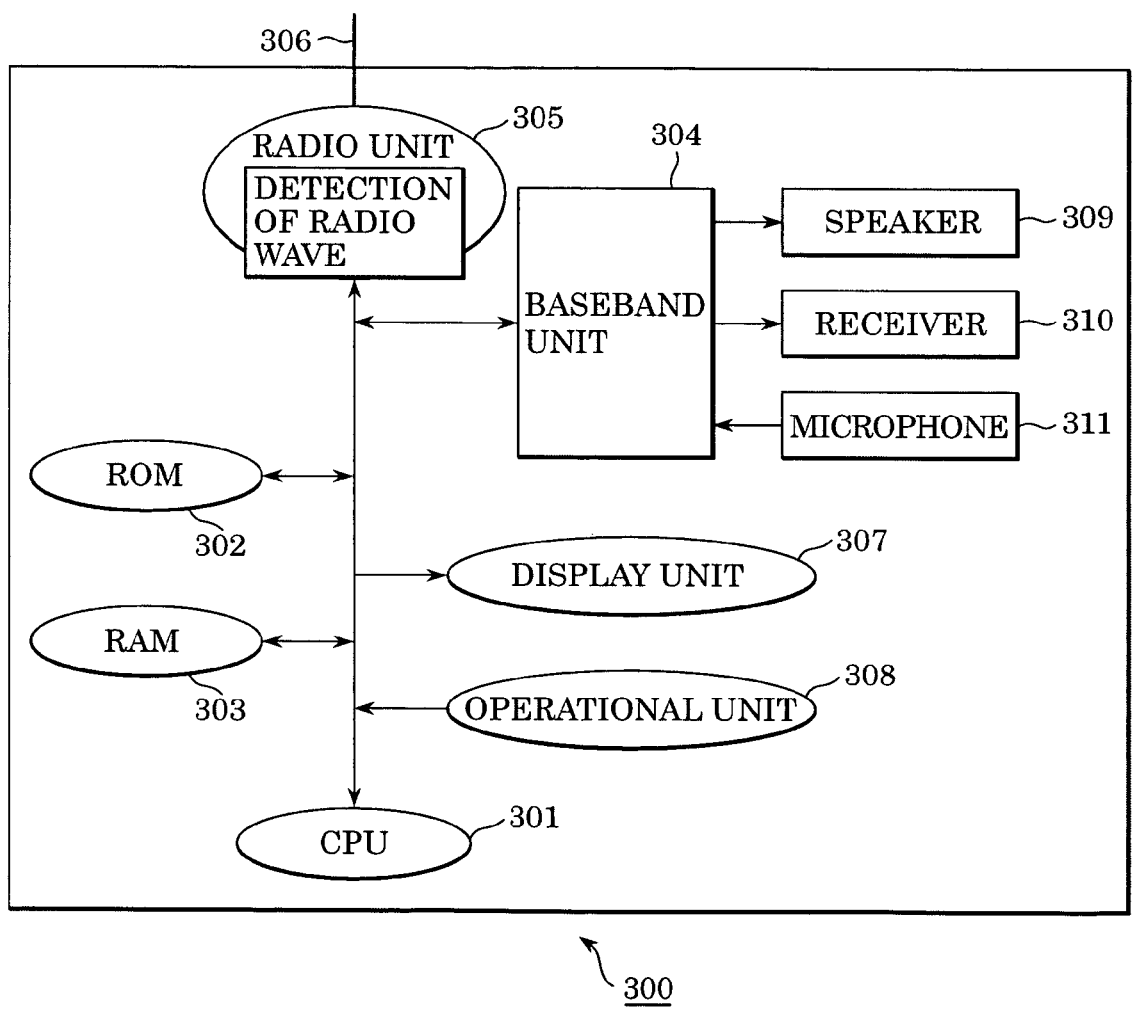
FIG. 3 is a block diagram of a control system of a wireless handset of the communication terminal shown in FIG. 1.

FIG. 3 shows the structure of the wireless telephone (hereinafter, referred to also as a wireless handset) 300 shown in FIG. 1.

In FIG. 3, a CPU 301 controls the entire system of the wireless telephone 300. A ROM 302 stores a control program to be performed by the CPU 301 and may be composed of an EEPROM for storing a call sign (system ID) of this wireless communication system and a handset ID number in the wireless telephone set, a flash ROM for storing text data when receiving an email message from the base and address data, or the like. The RAM 303 is used as a work area for processing of the CPU 301.

The handset operational unit 308 is composed of dialing keys for inputting a phone number and a function key, such as a key used to access an outside line, a hold key, a speaker key, an address-book key, and the like.

The handset display unit 307 is used for displaying the arrival of a call, a number dialed with the handset operational unit 308, the usage of a public circuit, and the like. The handset display unit 307 is composed of a display device, such as a LCD.

A baseband unit 304 includes a modem with a compandor and amplifier and privacy functions, and allows control data and audio signals to be transmitted and received. The baseband unit 304 transmits modulated signals to the base 200 via a handset radio unit 305, which is described later. The baseband unit 304 demodulates modulated signals from the handset radio unit 305, and outputs the demodulated signals to the CPU 301 and outputs audio signals to a speaker 309.

The handset radio unit 305 converts modulated signals from the baseband unit 304 into a form that can be transmitted with wireless communication and transmits them to the handset antenna 306. The handset radio unit 305 also retrieves modulated signals from signals received from the handset antenna 306 with wireless communication and outputs them to the baseband unit 304. The handset radio unit 305 has a function of detecting a level to check the radio field intensity between the wireless handset 300 and the base 200. Therefore, the handset radio unit 305 detects the level of radio waves emitted from the base 200 and converts it from analog to digital, so that the radio field intensity can be determined by the CPU 301.

A handset microphone 311 is used for inputting audio signals during call. A handset speaker 309 is used for outputting audio signals as amplified sounds and sounding ring tones. A handset receiver 310 is used for outputting audio signals during call. The handset microphone 311, the handset speaker 309, and the handset receiver 310 constitute an audio inputting and outputting unit for audio communication with the wireless handset 300.

Figure 4:
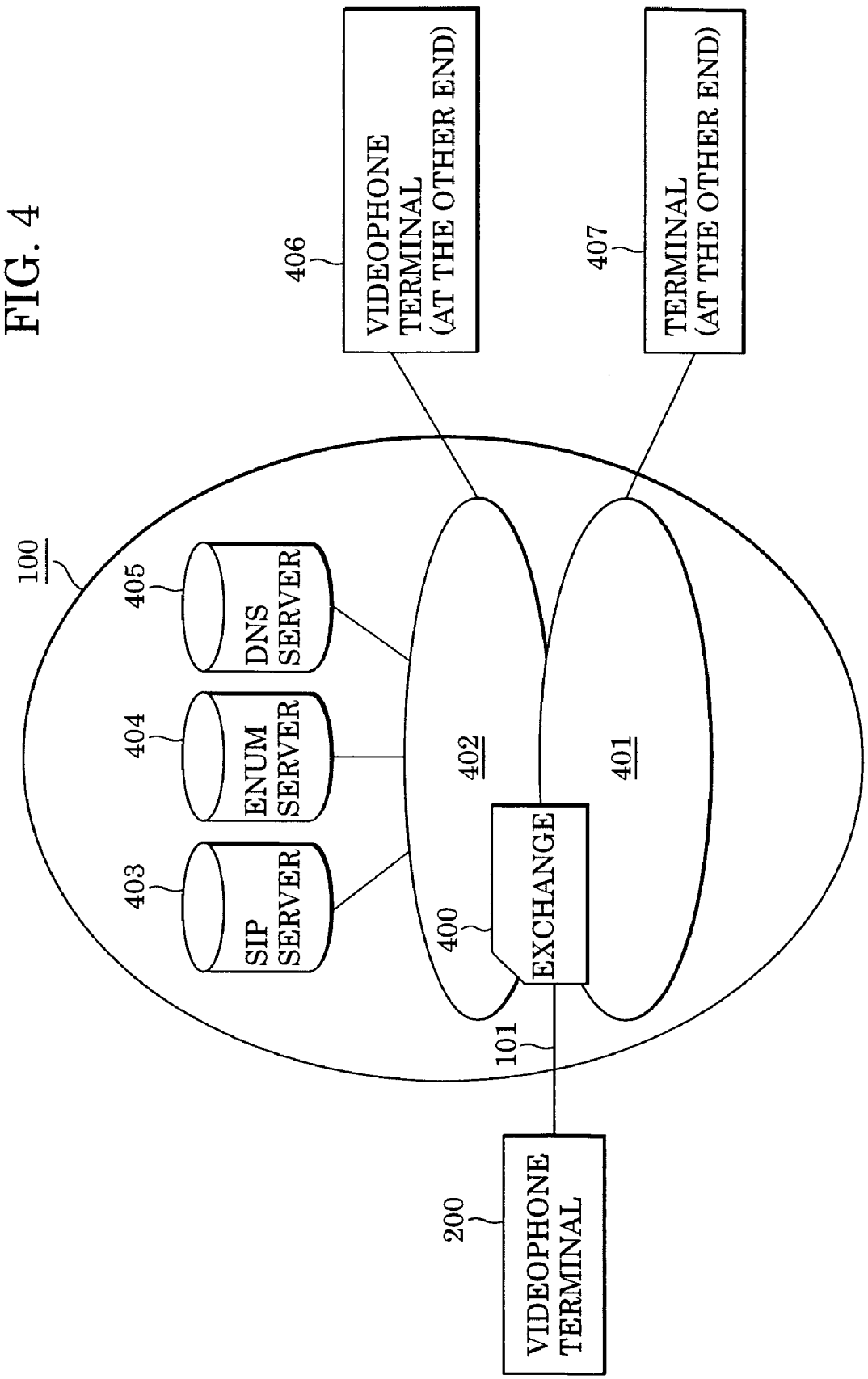
FIG. 4 shows a network environment where the communication terminal shown in FIG. 1 communicates.

FIG. 4 shows the entire network environment including a public circuit capable of connecting to the communication terminal 200 according to this embodiment shown in FIG. 1.

In FIG. 4, the communication terminal 200 is connected to the public network 100 with the public line 101.

The public network 100 includes an exchange 400, and the exchange 400 divides communication into communication for a circuit switched network 401 and communication for an IP network 402. The exchange 400 includes a subscriber port for the circuit switched network 401, the subscriber port being connected to the communication terminal 200 in a one-to-one relationship, and includes a digital subscriber line access multiplexer (DSLAM) board for the IP network 402.

For the circuit switched network 401, when it is an ordinary PSTN line, the communication terminal 200 is controlled such that connection between exchanges is performed by line switching and the communication terminal 200 is connected to a terminal 407 at the other end.

For IP telephony communication over the IP network 402, control of originating and receiving a call is performed by the SIP method. In the case when the communication terminal 200 requests connection, the communication terminal 200 communicates with a SIP server 403 which establishes connection in response to this request. When a call is originated from the communication terminal 200, a predetermined SIP message is sent to the SIP server 403, as described below, and connection to a videophone terminal 406 (or a terminal 407) at the other end is requested. The SIP server 403 acquires an IP address of the terminal 406 at the other end by inquiring it of an electronic numbering (ENUM) server 404 and a domain name system (DNS) server 405, and establishes an IP connection using the acquired IP address. Therefore, the communication terminal 200 can connect to the videophone terminal 406 (or the terminal 407) at the other end connected to the circuit switched network 401 and the IP network 402.

The operation of the interactive audiovisual communication in the communication terminal described above is explained below.

FIGS. 5 to 8 show the sequences of events for IP telephony communication according to the first embodiment. In FIGS. 5 to 8, a call is originated from the communication terminal 406 (hereinafter, referred to also as the communication terminal A) capable of performing interactive audiovisual communication, and the call is connected to the communication terminal 200 (hereinafter, referred to also as the communication terminal B) structured as shown in FIGS. 1 and 2, and interactive audiovisual communication by IP telephony is performed.

The communication sequences shown in FIGS. 5 to 8 are realized by the execution of a communication control program by the CPU 201 shown in FIG. 2. This communication control program is stored in, for example, the ROM 202. In FIGS. 5 to 8, the procedure of the sequences is shown by step S501 and subsequent steps. In the communication shown in FIGS. 5 to 8, an ADSL connection is already established, and the communication terminal A (406) and the communication terminal B (200) are already connected to an IP network. The SIP server 403, the ENUM server 404, the DNS server 405, and the communication terminal 406 are the same as in FIG. 4.

First, the communication terminal A is dialed by a user (step S501 of FIG. 5), thereby connecting with the SIP server 403 by means of an INVITE message (step S502). At this time, a telephone number of the terminal (B) of a called party is conveyed to the SIP server 403.

The SIP server 403 determines a uniform resource locator (URL) using the ENUM server 404 from the telephone number of the terminal of the called party, and acquires an IP address using the DNS server 405 from the URL (step S503). The SIP server 403 sends an SIP session request to the terminal (B) using the IP address (step S504). During this operation, a ringback tone (RBT) is heard in the communication terminal A (step S505).

The communication terminal B performs a receiving operation in response to the INVITE request sent from the SIP server 403 (step S507). Then, the communication terminal B returns a ringing signal (Ringing) to the SIP server 403 (step S508), and the SIP server 403 sends the ringing signal (Ringing) to the communication terminal A (step S509).

When the communication terminal B responds (step S510), response information (OK) indicating call completion is sent to the SIP server 403 (step S511), and the SIP server 403 sends response information (OK) to the communication terminal A (step S512). In response to this, acknowledgement information (ACK) is sent from the communication terminal A to the communication terminal B through the SIP server 403 (steps S513 and S514).

Then, a logical channel is set up using an IP connection established between the communication terminal A and the communication terminal B (step S515), and audio and video packets are allowed to be exchanged over a real-time transport protocol (RTP) connection (step S516) to establish a-call between the communication terminal A and the communication terminal B (steps S517 and S518).

Figure 6:
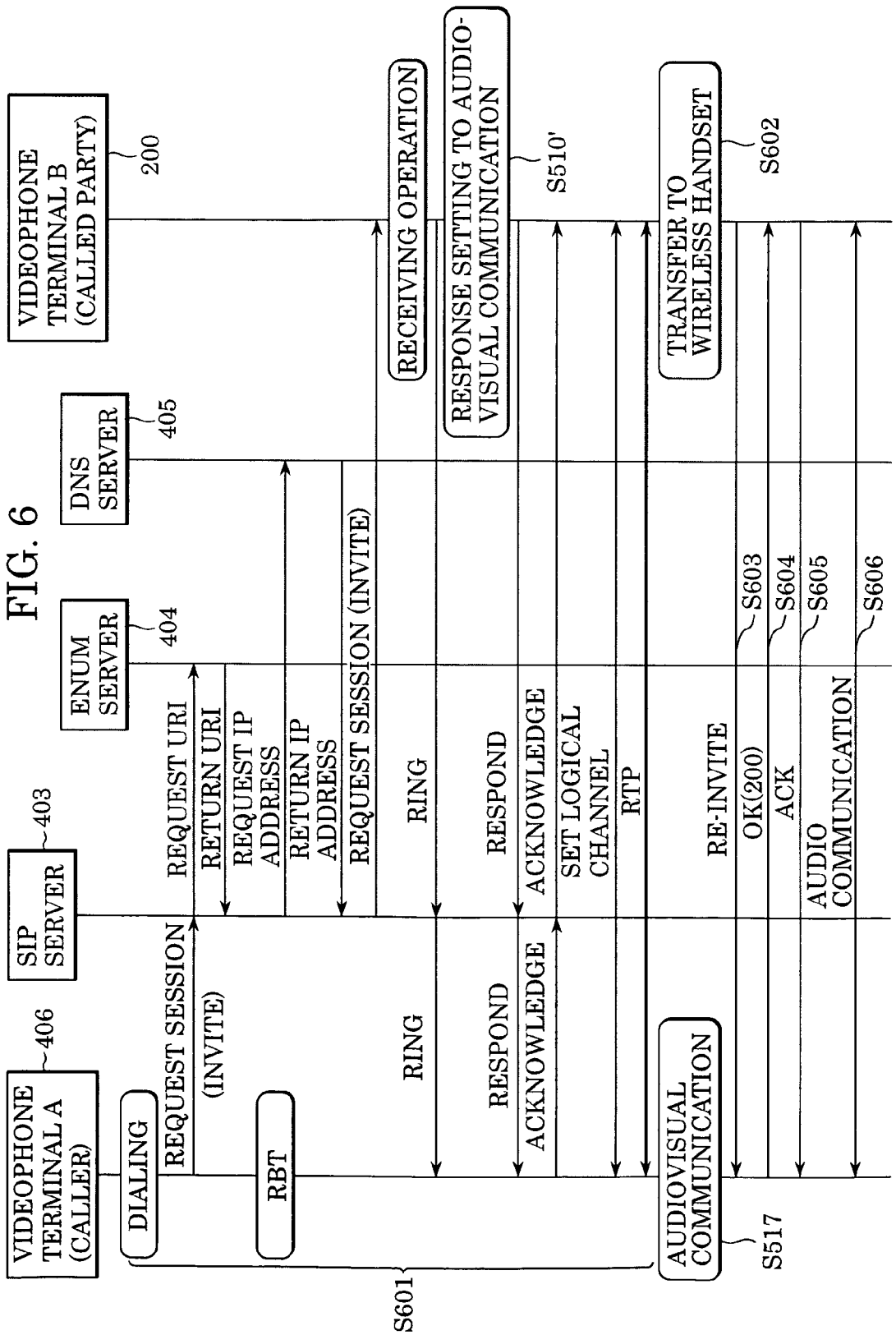
FIG. 6 shows how interactive audiovisual communication with the base is switched to audio communication with the wireless handset in the communication terminal shown in FIG. 1.

FIG. 6 shows the sequence of the events when, after the terminal A and the terminal B are connected in interactive audiovisual communication, the connection is then transferred to the wireless handset, so that the interactive audiovisual communication is switched to audio communication.

In FIG. 6, a call-origination sequence equal to steps S501 to S516 is performed in steps S601 and S517. At this time, the terminal B (200) structured as shown in FIG. 1 responds with the base and performs settings so as to carry out interactive audiovisual communication (step S510').

In step S602, when the operation of transfer from the base to the wireless handset is selected by the operation of the handset-transfer key 215a of the base operational unit 215 (or another appropriate operation) in the terminal B (200), a RE-INVITE message is sent from the communication terminal B (200) to the communication terminal A (step S603). If the communication terminal A acknowledges it, SIP messages OK and ACK are exchanged (steps S604 and S605). Therefore, switching interactive audiovisual communication using the base to audio communication with the wireless handset (step S606) is realized.

Figure 7:
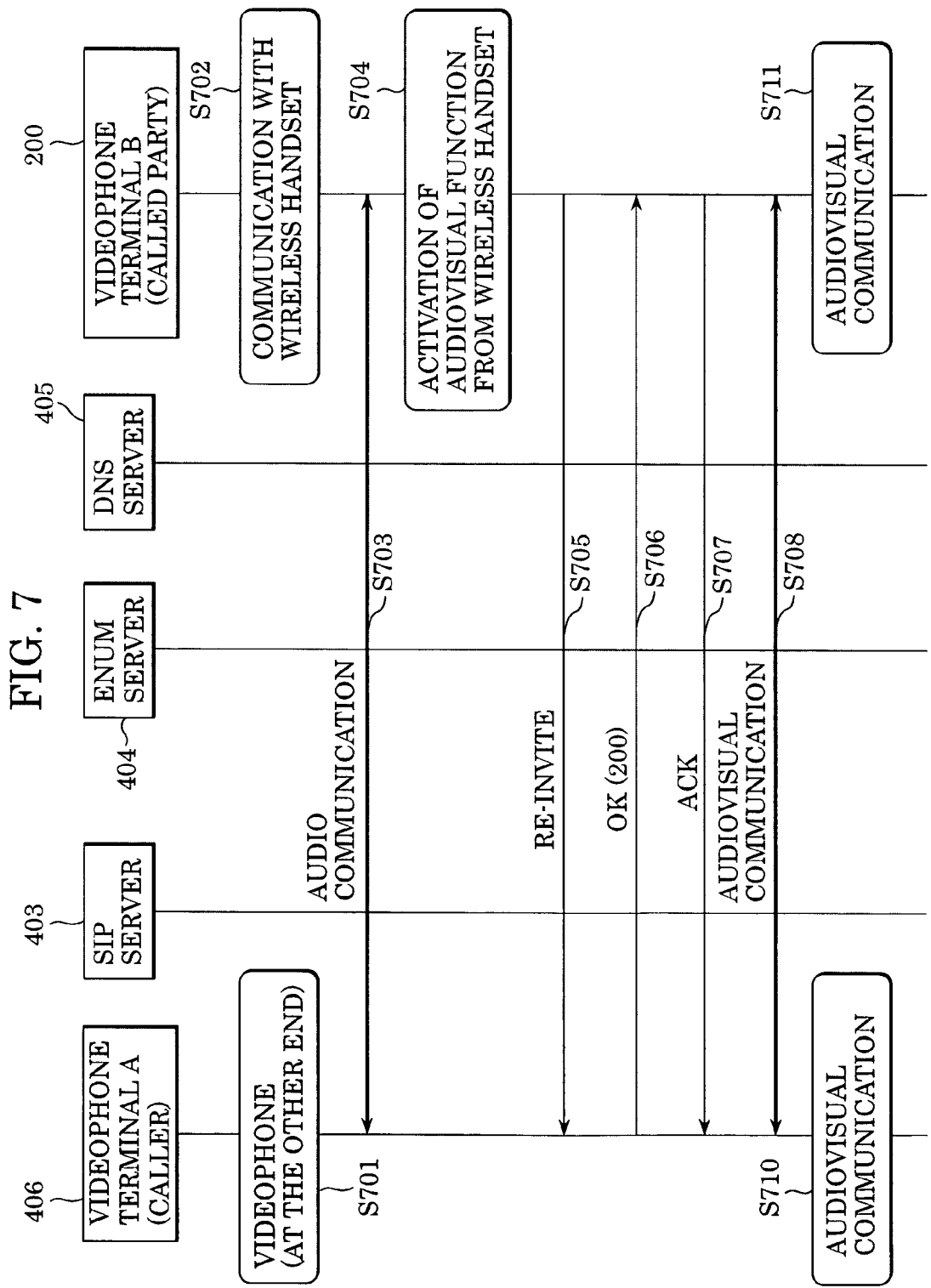
FIG. 7 shows how audio communication with the wireless handset is switched to interactive audiovisual communication with the base in the communication terminal shown in FIG. 1.

FIG. 7 shows the sequence of the events when, after the terminal A and the terminal B are connected, audio communication between the communication terminal A and the wireless handset of the communication terminal B is switched to interactive audiovisual communication.

Figure 10:
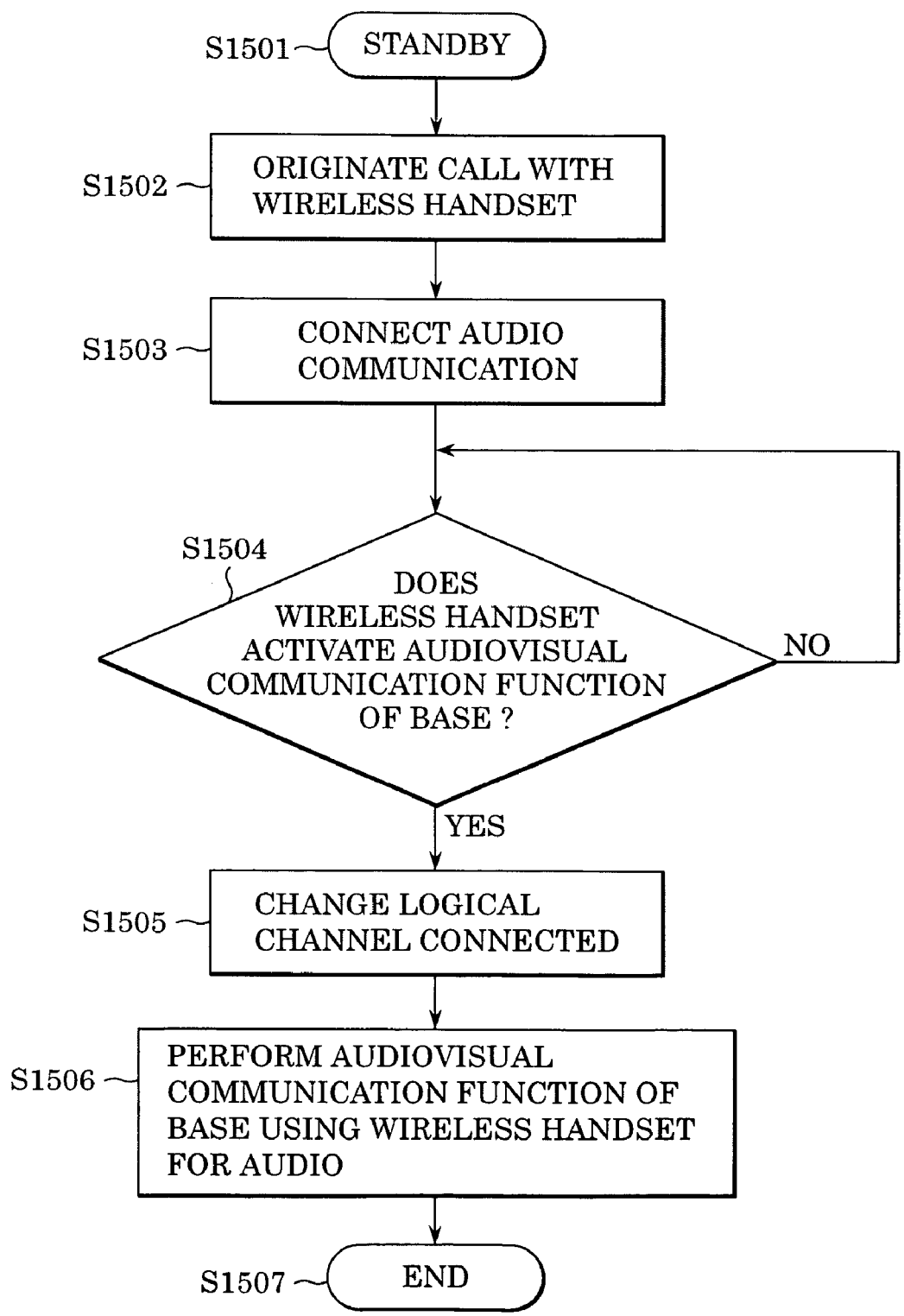
FIG. 10 is a flowchart of a control procedure for switching audio communication with the wireless handset to interactive audiovisual communication with the base in the communication terminal shown in FIG. 1.

In FIG. 7, origination and reception of a call is not shown. The audio communication between the communication terminal A and the wireless handset of the communication terminal B (steps S701, S702, and S703) is started by, for example, the sequence as shown in FIG. 6. It may be started by the origination of a call from the wireless handset, as shown in FIG. 10, which is described below.

When the function of interactive audiovisual communication is activated by the wireless handset of the communication terminal B (step S704), a RE-INVITE message is sent from the communication terminal B (200) to the communication terminal A (step S705). If the communication terminal A acknowledges it, SIP messages OK and ACK are exchanged (steps S706 and S707). Therefore, switching audio communication with the wireless handset to interactive audiovisual communication (steps S708, S710, and S711) is realized. In this case, according to this embodiment, images are input and output by the base and audio is input and output by the wireless handset. However, the interactive audiovisual communication may be performed with the wireless handset using an audio inputting and outputting unit and a camera of the wireless handset or may be performed with the base by transferring the connection to the base such that both images and audio are input and output by the base.

Figure 8:
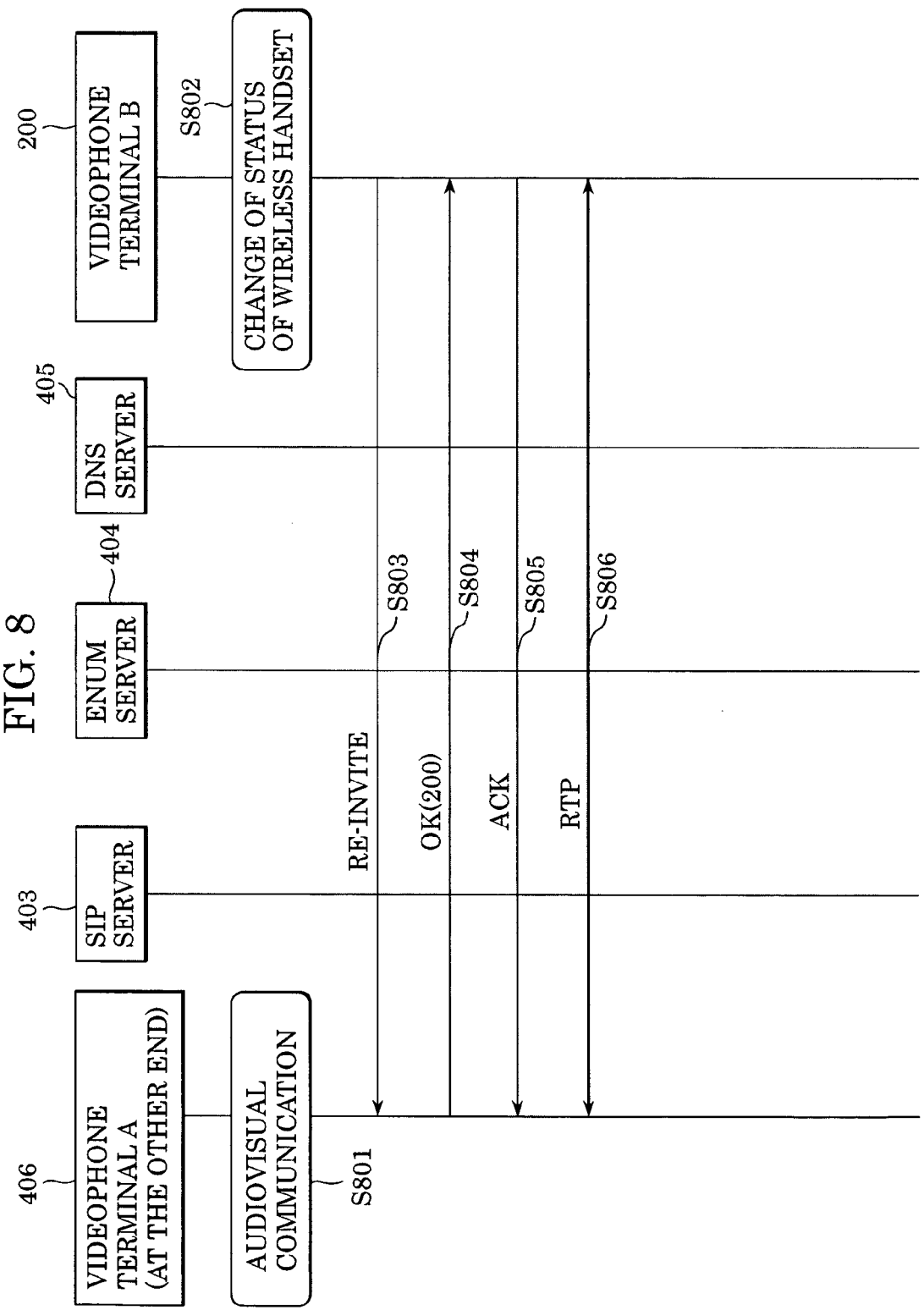
FIG. 8 shows how the communication is switched between interactive audiovisual communication and audio communication in the communication terminal shown in FIG. 1 in accordance with a change in a status of the wireless handset (the distance between the base and the wireless handset).

FIG. 8 shows the sequence of the events when, after the terminal A and the terminal B are connected with interactive audiovisual communication, interactive audiovisual communication is switched to audio communication in accordance with a change in a status of the wireless handset. In FIG. 8, origination and reception of a call is not shown. At the start of the sequence in FIG. 8, interactive audiovisual communication is performed (step S801 at the communication terminal A).

In this state, when a status of the wireless handset of the communication terminal B (200) is changed (step S802), for example, when the distance between the wireless handset and the base varies due to movement of the wireless handset (e.g., the wireless handset moves away from the base), the interactive audiovisual communication is automatically changed to audio communication even when no operation is performed in the wireless handset. In this case, a RE-INVITE message is sent from the communication terminal B (200) to the communication terminal A (step S803), and if the communication terminal A acknowledges it, SIP messages OK and ACK are exchanged (steps S804 and S805). Therefore, switching the interactive audiovisual communication using the base to the audio communication with the wireless handset (step S806) is realized.

FIGS. 9 to 12 are flowcharts for controlling the communication terminal 200 shown in FIGS. 1 and 2 (the communication terminal B shown in FIGS. 5 to 8) in order to control communication as described above. The procedures shown in FIGS. 9 to 12 are realized by the execution of the communication control program by the CPU 201, as is the case with the above embodiment. This communication control program to be performed by the CPU 201 is stored in the ROM 202.

Figure 9:
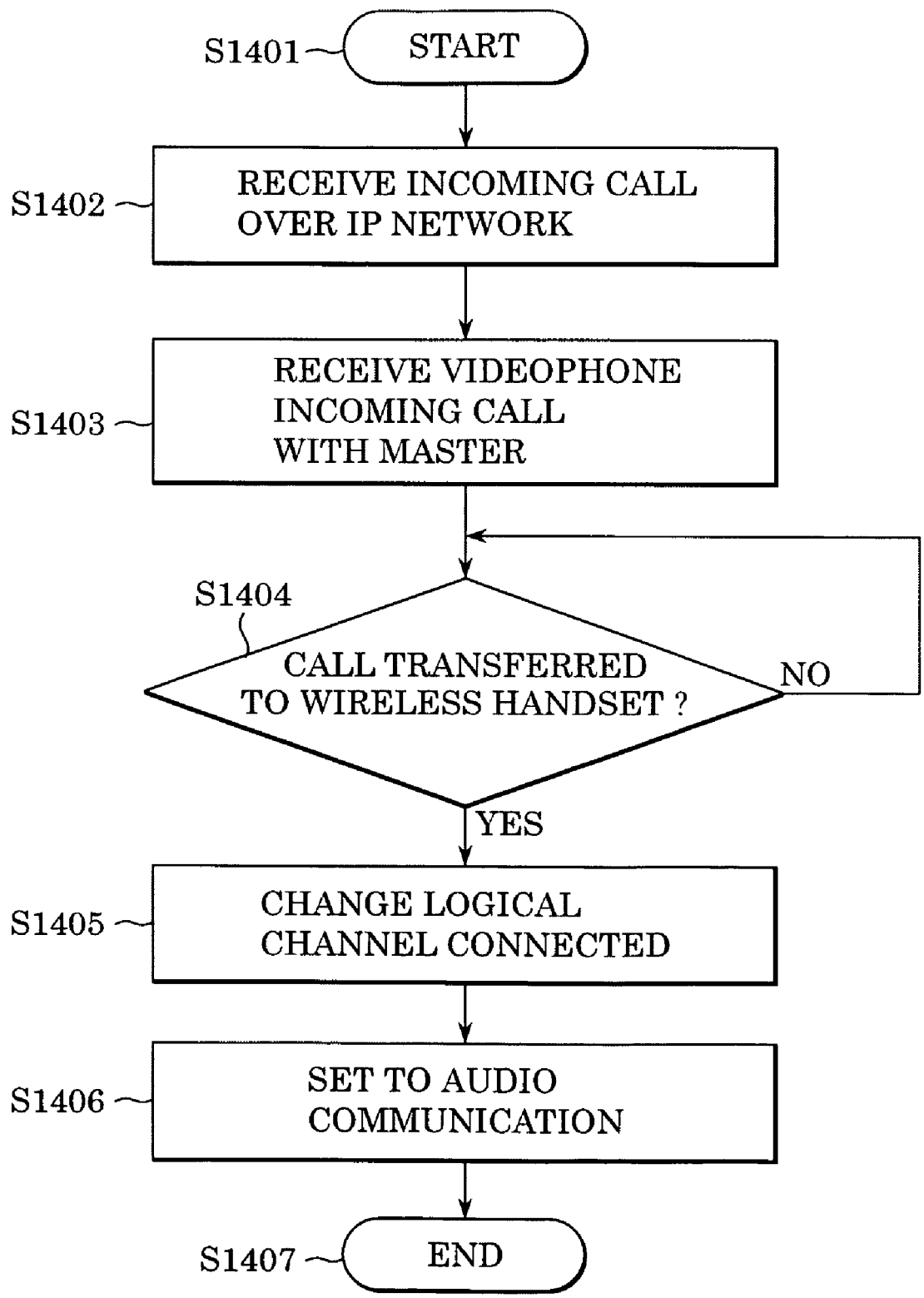
FIG. 9 is a flowchart of a control procedure for switching interactive audiovisual communication with the base to audio communication with the wireless handset in the communication terminal shown in FIG. 1.

In FIG. 9, step S1401 the control procedure begins. The control procedure is started, for example, by turning the power on to the terminal. In step S1402, when a call by IP telephony over an IP network is received, the reception of the call is controlled using SIP in the communication terminal 200 as in the steps shown in FIG. 5, so that a logical channel in interactive audiovisual communication is set between the communication terminal 200 and the terminal originating the call and interactive audiovisual communication is started.

In step S1403, the communication terminal 200 receives the call with the interactive audiovisual communication using the base, so that the interactive audiovisual communication is established between the communication terminal 200 and the terminal at the other end.

In step S1404, when the operation of transfer to the wireless handset is selected, for example, by the operation of the handset-transfer key 215a of the base of the communication terminal 200, the logical channel is changed from interactive audiovisual communication to audio communication, as shown in the sequence of FIG. 6 (steps 602 to S606). In FIG. 9, when the operation of transfer to the wireless handset is selected in step S1404, the connection of the logical channel is changed (step S1405) and is set to audio communication (step S1406). Therefore, the connection is transferred from the base to the wireless handset in response to a predetermined operation, so that the interactive audiovisual communication is switched to the audio communication while the call is continued.

Figure 5:
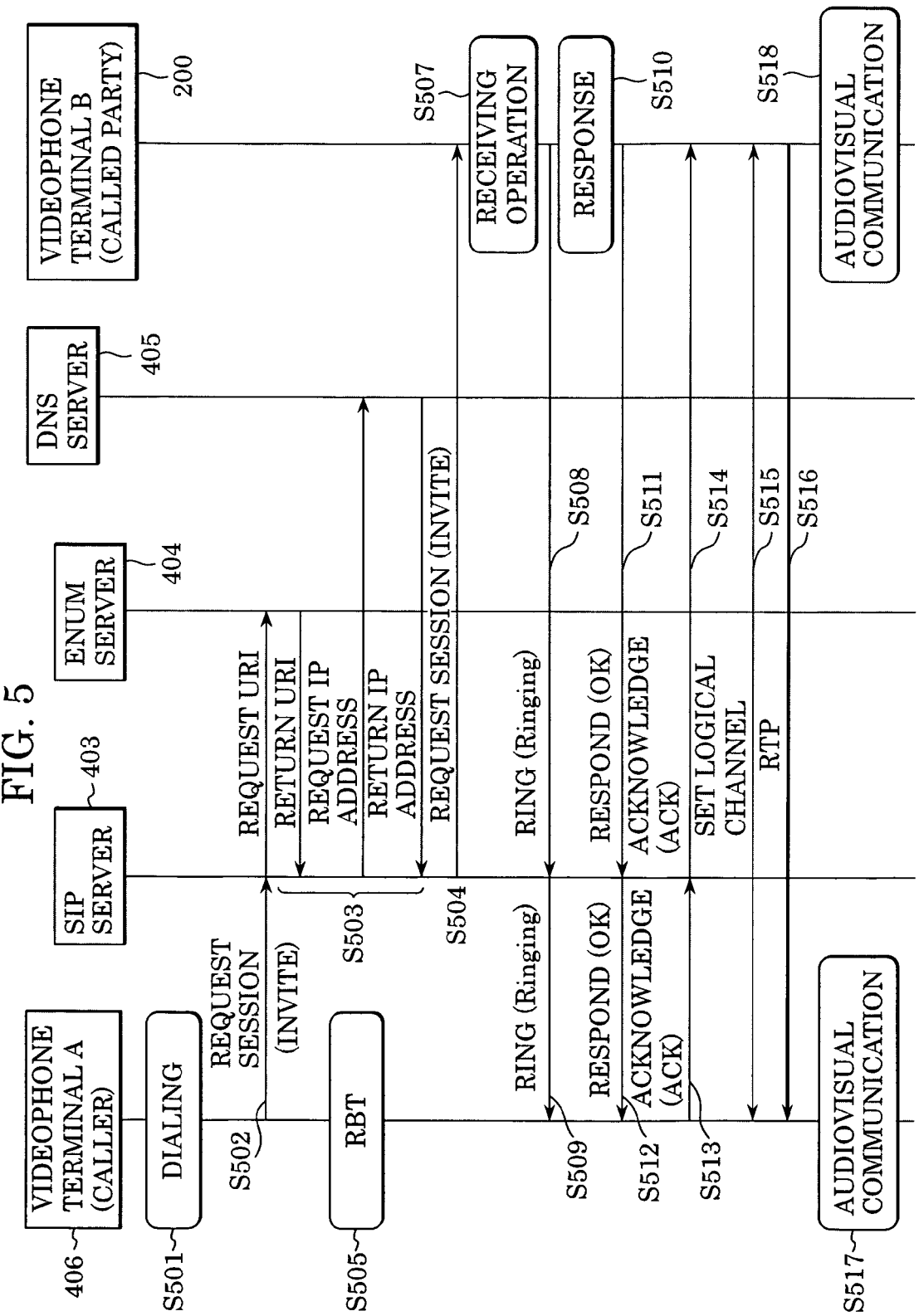
FIG. 5 shows how IP telephony communication using the communication terminal shown in FIG. 1 is performed.

FIG. 10 shows the procedure of the control for switching to interactive audiovisual communication when audio communication with the wireless handset is performed, as shown in the sequence in FIG. 7. In FIG. 10, a call is originated by the wireless handset 300 in the videophone 200 in step S1502. In response to the origination of the call, the SIP control equal to steps S501 to 516 shown in FIG. 5 is performed, the channel of audio communication is produced over an IP network, and audio communication is carried out (step S1503).

In step S1504, when a predetermined operation of the handset operational unit 308 of the wireless handset 300 (e.g., the operation of a key that is disposed on the handset operational unit 308 of the wireless handset 300 and that corresponds to the handset-transfer key 215a of the base) is performed, a RE-INVITE message is sent, as shown in FIG. 7. In response to this, the connection of the logical channel is changed (step S1505) and a function of interactive audiovisual communication of the base is activated (step S1506). In step S1506, the interactive audiovisual communication is performed such that the function of interactive audiovisual communication of the base is used while using the wireless handset for audio communication. The interactive audiovisual communication may be performed with the wireless handset using an audio inputting and outputting unit and a camera of the wireless handset or may be performed with the base by transferring to the base.

FIG. 11 shows the procedure for controlling communication to be automatically varied with a change in a status of the wireless handset, as shown in FIG. 8. In step S1601, the communication terminal is on standby, and then interactive audiovisual communication is started in such a way that images are input and output by the base and audio is input and output by the wireless handset (step S1602). In FIG. 11, when the wireless handset is at a predetermined distance or more away from the base, communication is controlled such that the interactive audiovisual communication is switched to audio communication with only the wireless handset.

In this state, the base (200) measures the distance to the wireless handset (300) in step S1603. When the base (200) determines that the wireless handset is at a predetermined distance or more away from the base, the processing moves to step S1604. In step S1604, a RE-INVITE message is sent, as shown in FIG. 8, and the logical channel is switched, so that the interactive audiovisual communication is switched to audio communication with only the wireless handset.

Measuring the distance to the wireless handset (300) may be realized by a known method. For example, the distance is determined by measuring the intensity of radio signals transmitted from the wireless handset to the base. For instance, the base radio unit 217 of the communication terminal 200 may detect the level of radio waves from the wireless handset and/or the level of received signal strength indicator (RSSI). The switching of communication may be performed in accordance with the level of radio waves from the handset radio unit 305. Alternatively, a unit for measuring the distance using infrared rays may be used.

Although not clearly shown in FIG. 11, the distance may be measured while audio communication with only the wireless handset is performed, and in accordance with the measured distance, the audio communication with only the wireless handset may be switched to interactive audiovisual communication.

For switching to the audio communication with only the wireless handset, a process in which the logical channel is not changed in response to a RE-INVITE message and displaying video on the base display unit 214 is turned off may be performed. However, this process has a problem in that unnecessary video data is transmitted and received because transmission and reception of video signals between the terminals cannot be stopped. Switching to audio communication in response to a RE-INVITE message prevents unnecessary data transmission and improves audio quality (a bit rate of audio communication is advantageously larger than that of interactive audiovisual communication).

As described above, in accordance with a status of the wireless handset, in particular, the distance between the wireless handset and the base, interactive audiovisual communication or the audio communication is selected. Therefore, a user can appropriately select interactive audiovisual communication or audio communication without a cumbersome operation.

FIG. 12 shows a different procedure for controlling communication to be varied with a status of the wireless handset. In FIG. 12, communication is controlled such that interactive audiovisual communication or audio communication is selected by the determination of whether a call originated from the wireless handset when the wireless handset is in the speakerphone mode.

In steps S1701 and S1702, the communication terminal on standby originates a call with the wireless handset. Then, in step S1703, it is determined whether the call originated in the speakerphone mode. If the call is determined to have originated in the speakerphone mode, the logical channel is switched to interactive audiovisual communication (step S1704), and the interactive audiovisual communication is performed (step S1705) such that video is input and output by the base and audio is input and output by the wireless handset. If the call is determined not to have originated in the speakerphone mode, the logical channel is switched to audio communication (step S1706), and audio communication with only the wireless handset is performed (step S1707).

As described above, interactive audiovisual communication or audio communication is automatically selected in accordance with the determination of whether a call from the wireless handset originated in the speakerphone mode. Therefore, a user can appropriately select interactive audiovisual communication or audio communication without a cumbersome operation.

As shown in the embodiment described above, according to the present invention, a communication terminal including a base and a handset connected to the base with a wireless connection is capable of transferring the audio communication channel of interactive audiovisual communication or audio communication in response to the operation of the base or the wireless handset performed by a user.

Interactive audiovisual communication with the base can be switched to an interactive audiovisual communication, in which images are input and output by an image inputting and outputting unit of the base and audio is input and output by an audio inputting and outputting unit of the base handset, by transferring only the audio communication channel to the wireless handset in response to a predetermined operation. This expands the range in which the user can carry the handset. In contrast to this, audio communication with the wireless handset can be switched to interactive audiovisual communication, for example, an interactive audiovisual communication, in which images are input and output by an image inputting and outputting unit of the base and audio is input and output by an audio inputting and outputting unit of the wireless handset, by activating a function of interactive audiovisual communication of the base in response to a predetermined operation. Therefore, the function of interactive audiovisual communication can be utilized when necessary.

In accordance with a status of the wireless handset, in particular, the distance between the base and the wireless handset, when the wireless handset is at a predetermined distance or more away from the base, the interactive audiovisual communication described above can be stopped and be switched to audio communication in which audio is input and output by the audio inputting and outputting unit of the wireless handset. As a result, in accordance with the status of the wireless handset, in particular, the distance between the base and the wireless handset, unnecessary input and output of images and unnecessary transmission of image data can be stopped. Therefore, the line can be efficiently utilized. In addition, shifting to audio communication can improve sound quality.

In addition, interactive audiovisual communication or audio communication can be automatically selected by the determination of whether a call from the wireless handset originated in the speakerphone mode. As a result, communication corresponding to the current usage of the wireless handset is performed without a cumbersome operation.

According to the present invention, both interactive audiovisual communication and audio communication can be performed using the procedure of IP telephony over an IP network. A user can efficiently communicate with a party at a distant location at small communication charges by using, for example, a broadband communication.

In the above embodiment, the communication terminal includes interfaces for both an IP network and a circuit switched network. However, the communication terminal may include only an interface for an IP network.

Another Embodiment

The embodiment of the present invention is described above. The present invention is applicable to a system including a plurality of devices and to an apparatus composed of a single device.

The present invention can be realized by supplying a program for realizing the features of the embodiment described above directly or remotely to a system or an apparatus and reading and executing program code of the supplied program in the system or the apparatus. As a result, program code to be installed or installed in a computer is included in the scope of the present invention.

In this case, the program code may have any form, such as object code, a program executable by an interpreter, script data to be supplied to an operating system (OS) as long as it functions as a program.

Examples of storage media for supplying a program include a floppy disk, a hard disk, an optical disk, a magneto-optical disk (MO), a compact disc read-only memory (CD-ROM), a CD recordable (CD-R), a CD-Rewritable (CD-RW), magnetic tape, a nonvolatile memory card, a ROM, a digital versatile disk (DVD), including a DVD-ROM and DVD-R, and the like.

Examples of methods for supplying a program include connecting a website on the Internet using a browser of a client computer and downloading a computer program according to the present invention or a compressed file of the program with an automatic installer from a website to a storage medium in a hard disk; and dividing program code constituting the program according to the present invention into a plurality of files and downloading each file from different websites. In other words, a World Wide Web (WWW) server allowing a program file for realizing the processing of the features according to the present invention in a computer to be downloaded to a plurality of users is included in the scope of the claims of the present invention.

Encrypting a program according to the present invention, storing the encrypted program in storage media, such as CD-ROMs, distributing them to users, allowing a user who satisfies a predetermined condition to download information regarding a decryption key from a website over the Internet and to execute the encrypted program using the information regarding the key, thereby enabling the user to install the program in a computer is applicable.

In addition to the execution of a read program by means of a computer, performing actual processing in part or in entirety by means of an operating system (OS) running on a computer on the basis of an instruction of the program can realize the features of the embodiments described above.

Additionally, a program read from a storage medium is written on a memory included in a feature expansion board inserted into a computer or in a feature expansion unit connected to the computer, and a CPU included in the feature expansion board or the feature expansion unit performs actual processing in part or in entirety on he basis of an instruction of the program, thereby realizing the features of the embodiments described above.

As described above, an audio communication channel of interactive audiovisual communication or audio communication can be transferred between a base and a handset connected to the base with a wireless connection. For an interactive audiovisual communication in which images are input and output by an image inputting and outputting unit of the base and audio is input and output by an audio inputting and outputting unit of the wireless handset, an excellent advantage obtained is that the range in which the user can carry the wireless handset is expanded.

In addition, interactive audiovisual communication or audio communication can be automatically selected in accordance with the distance between the base and the wireless handset and/or the originating mode of the wireless handset. As a result, another excellent advantage obtained is that communication matching the current usage of the wireless handset is realized with without a cumbersome operation.

As many apparently widely different embodiments of the present invention can be made without departing from the spirit and scope thereof, it is to be understood that the invention is not limited to the specific embodiments thereof except as defined in the appended claims.

The present application claims priority from Japanese Patent Application No. 2004-169279 which is incorporated herein by reference.

What is claimed is:

1. A communication terminal for performing interactive audiovisual communication or audio communication using Internet Protocol (IP) telephony over an IP network, the communication terminal comprising:
   a base;
   a wireless handset;
   a transferring unit adapted to transfer an audio communication channel or an interactive audiovisual communication channel between the base and the wireless handset;
   a detecting unit; and
   a controlling unit,
   wherein the base includes,
      an image inputting and outputting unit adapted to input and output images for the interactive audiovisual communication; and
      an audio inputting and outputting unit adapted to input and output audio for the interactive audiovisual communication or the audio communication,
   wherein the wireless handset includes,
      a connecting unit adapted to connect to the base via a wireless connection; and
      an audio inputting and outputting unit adapted to input and output audio for at least the audio communication,
   wherein the transferring unit transfers the audio communication channel or the interactive audiovisual communication channel in accordance with a status of the wireless handset,
   wherein the detecting unit detects a distance between the wireless handset and the base as the status of the wireless handset while an interactive audiovisual communication is performed in which images are input and output by the image inputting and outputting unit of the base and audio is input and output by the audio inputting and outputting unit of the wireless handset, and
   wherein, according to the detected distance, the controlling unit discontinues said interactive audiovisual communication and moves communication to an audio communication in which audio is input and output by the audio inputting and outputting unit of the wireless handset when the wireless handset is at a predetermined distance or greater from the base.

2. A communication terminal for performing interactive audiovisual communication or audio communication using Internet Protocol (IP) telephony over an IP network, the communication terminal comprising:

a base;
a wireless handset;
a transferring unit adapted to transfer an audio communication channel or an interactive audiovisual communication channel between the base and the wireless handset;
wherein the base includes,
an image inputting and outputting unit adapted to input and output images for the interactive audiovisual communication; and
an audio inputting and outputting unit adapted to input and output audio for the interactive audiovisual communication or the audio communication,
wherein the wireless handset includes,
a connecting unit adapted to connect to the base via a wireless connection; and
an audio inputting and outputting unit adapted to input and output audio for at least the audio communication,
wherein the transferring unit transfers the audio communication channel or the interactive audiovisual communication channel in accordance with a status of the wireless handset,
wherein at origination of a communication, an origination mode in the wireless handset is detected as the status of the wireless handset;
when the detected origination mode in the wireless handset is a speakerphone mode, an interactive audiovisual communication is selected in which images are input and output by the image inputting and outputting unit of the base and audio is input and output by the audio inputting and outputting unit of the wireless handset; and
when the detected origination mode in the wireless handset is not the speakerphone mode, an audio communication is selected in which audio is input and output by the audio inputting and outputting unit of the wireless handset.

3. A communication terminal for performing interactive audiovisual communication or audio communication, the communication terminal comprising:
a base;
a wireless handset;
a switching unit adapted to switch an audio communication channel or an interactive audiovisual communication channel between the base and the wireless handset;
a detecting unit; and
a controlling unit,
wherein the base includes,
an image inputting and outputting unit adapted to input and output images for the interactive audiovisual communication; and
an audio inputting and outputting unit adapted to input and output audio for the interactive audiovisual communication or the audio communication,
wherein the wireless handset includes,
a connecting unit adapted to connect to the base with a wireless connection; and
an audio inputting and outputting unit adapted to input and output audio for at least the audio communication,
wherein the switching unit switches the audio communication channel or the interactive audiovisual communication channel accordance with a status of the wireless handset,
wherein the detecting unit detects a distance between the wireless handset and the base as the status of the wireless handset while an interactive audiovisual communication is performed in which images are input and output by the image inputting and outputting unit of the base and audio is input and output by the audio inputting and outputting unit of the wireless handset, and
wherein, according to the detected distance, the controlling unit discontinues said interactive audiovisual communication and moves communication to an audio communication in which audio is input and output by the audio inputting and outputting unit of the wireless handset when the wireless handset is at a predetermined distance or greater from the base.

4. A communication terminal for performing interactive audiovisual communication or audio communication, the communication terminal comprising:
a base;
a wireless handset;
a switching unit adapted to switch an audio communication channel or an interactive audiovisual communication channel between the base and the wireless handset;
wherein the base includes,
an image inputting and outputting unit adapted to input and output images for the interactive audiovisual communication; and
an audio inputting and outputting unit adapted to input and output audio for the interactive audiovisual communication or the audio communication,
wherein the wireless handset includes,
a connecting unit adapted to connect to the base with a wireless connection; and
an audio inputting and outputting unit adapted to input and output audio for at least the audio communication,
wherein the switching unit switches the audio communication channel or the interactive audiovisual communication channel accordance with a status of the wireless handset,
wherein at origination of a communication, an origination mode in the wireless handset is detected as the status of the wireless handset; and
when the detected origination mode in the wireless handset is a speakerphone mode, an interactive audiovisual communication is selected in which images are input and output by the image inputting and outputting unit of the base and audio is input and output by the audio inputting and outputting unit of the wireless handset; and
when the detected origination mode in the wireless handset is not the speakerphone mode, an audio communication is selected in which audio is input and output by the audio inputting and outputting unit of the wireless handset.

5. A method for controlling a communication terminal including a base and a wireless handset, the method comprising:
inputting and outputting images for interactive audiovisual communication at the base;
inputting and outputting audio for the interactive audiovisual communication or an audio communication at the base;
connecting the wireless handset to the base with a wireless connection;
inputting and outputting audio for at least the audio communication at the wireless handset; and
transferring an audio communication channel or an interactive audiovisual communication channel between the base and the wireless handset, wherein the transfer of the audio communication channel or the interactive audiovisual communication channel is performed in accordance with a status of the wireless handset;

detecting a distance between the wireless handset and the base as the status of the wireless handset while an interactive audiovisual communication is performed in which images and are input and output at the base and audio is input and output at the wireless handset;

discontinuing said interactive audiovisual communication; and moving communication, according to the detected distance, to an audio communication in which audio is input and output at the wireless handset when the wireless handset is at a predetermined distance or greater from the base.

6. A method for controlling a communication terminal including a base and a wireless handset, the method comprising:

inputting and outputting images for interactive audiovisual communication at the base;

inputting and outputting audio for the interactive audiovisual communication or an audio communication at the base;

connecting the wireless handset to the base with a wireless connection;

inputting and outputting audio for at least the audio communication at the wireless handset;

transferring an audio communication channel or an interactive audiovisual communication channel between the base and the wireless handset, wherein the transfer of the audio communication channel or the interactive audiovisual communication channel is performed in accordance with a status of the wireless handset, wherein at origination of a communication, an origination mode in the wireless handset is detected as the status of the wireless handset; and when the detected origination mode in the wireless handset is a speakerphone mode, an interactive audiovisual communication is selected in which images are input and output at the base and audio is input and output at the wireless handset; and when the detected origination mode in the wireless handset is not the speakerphone mode, an audio communication is selected in which audio is input and output at the wireless handset.

7. Computer-executable process steps for controlling a communication terminal including a base and a wireless handset, comprising:

inputting and outputting images for interactive audiovisual communication at the base;

inputting and outputting audio for the interactive audiovisual communication or an audio communication at the base;

connecting the wireless handset to the base with a wireless connection;

inputting and outputting audio for at least the audio communication at the wireless handset;

transferring an audio communication channel or an interactive audiovisual communication channel between the base and the wireless handset, wherein the transfer of the audio communication channel or the interactive audiovisual communication channel is performed in accordance with a status of the wireless handset;

detecting a distance between the wireless handset and the base as the status of the wireless handset while an interactive audiovisual communication is performed in which images and are input and output at the base and audio is input and output at the wireless handset;

discontinuing said interactive audiovisual communication; and moving communication, according to the detected distance, to an audio communication in which audio is input and output at the wireless handset when the wireless handset is at a predetermined distance or greater from the base.

8. Computer-executable process steps for controlling a communication terminal including a base and a wireless handset, comprising:

inputting and outputting images for interactive audiovisual communication at the base;

inputting and outputting audio for the interactive audiovisual communication or an audio communication at the base;

connecting the wireless handset to the base with a wireless connection;

inputting and outputting audio for at least the audio communication at the wireless handset; and transferring an audio communication channel or an interactive audiovisual communication channel between the base and the wireless handset, wherein the transfer of the audio communication channel or the interactive audiovisual communication channel is performed in accordance with a status of the wireless handset, wherein at origination of a communication, an origination mode in the wireless handset is detected as the status of the wireless handset; and when the detected origination mode in the wireless handset is a speakerphone mode, an interactive audiovisual communication is selected in which images are input and output at the base and audio is input and output at the wireless handset; and when the detected origination mode in the wireless handset is not the speakerphone mode, an audio communication is selected in which audio is input and output at the wireless handset.

* * * * *